US006986524B2

(12) United States Patent
Heitzmann (10) Patent No.: US 6,986,524 B2
(45) Date of Patent: Jan. 17, 2006

(54) FIFTH WHEEL PIN BOX ASSEMBLY (76) Inventor: David E. Heitzmann, 70685 S. Sunset Blvd., Union, MI (US) 49130

( * ) Notice: Subject to any disclaimer, the term of this patent is extended or adjusted under 35 U.S.C. 154(b) by 0 days.

(21) Appl. No.: 10/694,507

(22) Filed: Oct. 27, 2003

(65) Prior Publication Data
US 2005/0087956 A1 Apr. 28, 2005

(51) Int. Cl.
B62D 53/08 (2006.01)
(52) U.S. Cl. .................. 280/433; 280/440; 280/439
(58) Field of Classification Search ............... 280/433, 280/439, 440, 504, 506
See application file for complete search history.

(56) References Cited

U.S. PATENT DOCUMENTS

| 3,633,941 | A | * | 1/1972 | Pleier | 280/440 |
| 3,747,942 | A | * | 7/1973 | Hammond | 369/72 |
| 3,893,712 | A | * | 7/1975 | Sallier | 280/440 |
| 3,897,086 | A | * | 7/1975 | Breford | 280/438.1 |
| 4,861,060 | A | * | 8/1989 | Schult et al. | 280/439 |
| 4,955,631 | A | * | 9/1990 | Meyer | 280/438.1 |
| 5,785,341 | A |   | 7/1998 | Fenton |  |

* cited by examiner

Primary Examiner—Lesley D. Morris
Assistant Examiner—L. Lum (57) ABSTRACT

A fifth wheel pin box assembly for towing a trailer behind a towing vehicle including a column, a top member secured to the column, a rubber shear spring, a first plate on the rubber shear spring attached to the top member, a skid pad, a second plate on the rubber shear spring attached to the skid pad, a rubber member bonded between the first and second plates, and a pin extending downwardly from the skid pad.

21 Claims, 8 Drawing Sheets

FIFTH WHEEL PIN BOX ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved fifth wheel pin box assembly which incorporates a rubber shear spring.

By way of background, there are in existence numerous types of fifth wheel pin box assemblies wherein a pin on the towed vehicle is inserted into a receptacle on the towing vehicle for coupling the two vehicles. However, insofar as known, prior fifth wheel pin box assemblies did not have any structure associated with them which would permit appreciable cushioned substantially planar or lateral movement which could cushion the connection between the two vehicles.

BRIEF SUMMARY OF THE INVENTION

It is the primary object of the present invention to provide an improved fifth wheel pin box assembly which will couple a towed vehicle smoothly to the towing vehicle to thereby cushion the sensation which is experienced when the coupled vehicles start up, slow down, and pass over bumps.

Another object of the present invention is to provide an improved fifth wheel pin box assembly which utilizes relatively simple parts which can be easily manufactured. Other objects and attendant advantages of the present invention will readily be perceived hereafter.

The present invention relates to a fifth wheel pin box assembly for towing a trailer behind a towing vehicle comprising a top member, a rubber shear spring, a first plate on said rubber shear spring attached relative to said top member, a skid pad, a second plate on said rubber shear spring attached relative to said skid pad, a rubber member bonded between said first and second plates, and a pin extending downwardly from said skid pad.

The various aspects of the present invention will be more fully understood when the following portions of the specification are read in conjunction with the accompanying drawings wherein:

DETAILED DESCRIPTION OF THE INVENTION

Summarizing briefly in advance, the pin box assembly of the present invention provides overall towing smoothness because of its utilization of a rubber shear spring. It cushions start-up and slow-down sensations due to the yieldability of the rubber shear spring in all lateral directions. In addition, it cushions the sensations which are experienced when the coupled fifth wheel vehicles pass over bumps and railroad tracks and turn corners because of the yieldability of the rubber shear spring. The foregoing advantages will be more readily appreciated when the structures of the following embodiments are explained.

In FIGS. 1–10 one embodiment 10 of a fifth wheel pin box assembly is shown. This embodiment includes a column attachment member 11 for securement to a corresponding column (not shown) on a trailer by means of suitable connecting members, such as bolts, which extend through apertures 12 in the sides 13 which are joined by end plate 14. Flanges 15 are formed at the ends of sides 13. The bottom edges of sides 13 and 14 and flanges 15 are welded to a top member in the form of a plate 17 which has bent-over ends 19. Strips 20 are welded to the sides of top plate 17 and to the sides of bent-over ends 19. Channel members 21 have the edges of their legs welded to top plate 17, and elongated plastic blocks 22 have threaded studs 23 extending outwardly therefrom which are received in bores 24 in the webs 25 of channels 21, and they are retained therein by suitable nuts (not shown) to attach blocks 22 to channel members 21. As will become apparent hereafter, the top member 17 need not be in the form of a plate, but can be any structure which supports the channels or any other structure which serves the function of the channels.

Figure 1:
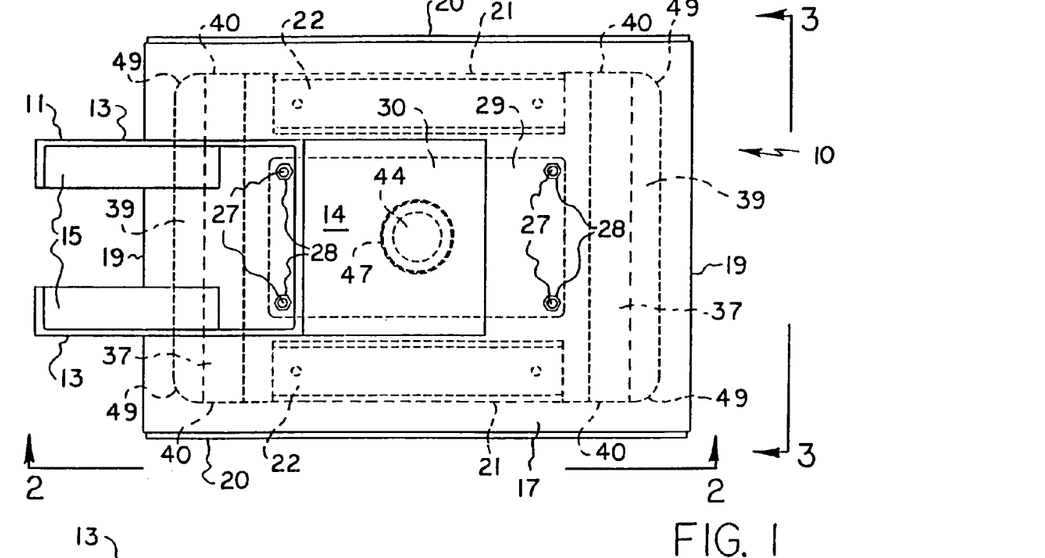
FIG. 1 is a plan view of one embodiment of an improved fifth wheel pin box assembly of the present invention.
Figure 2:
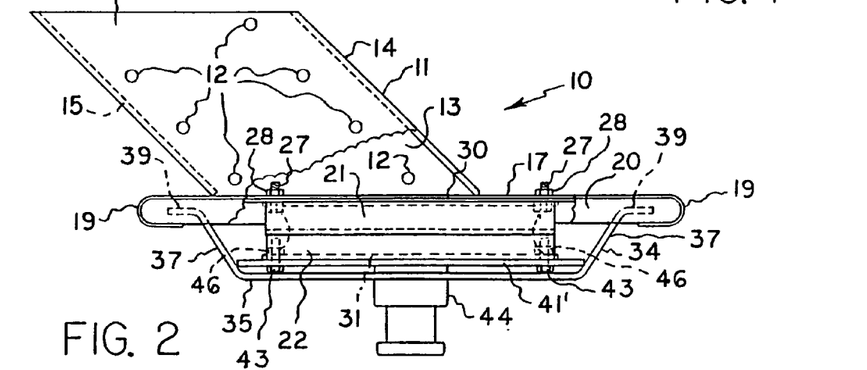
FIG. 2 is a partially broken-away side elevational view taken substantially in the direction of arrows 2—2 of FIG. 1.
Figure 3:
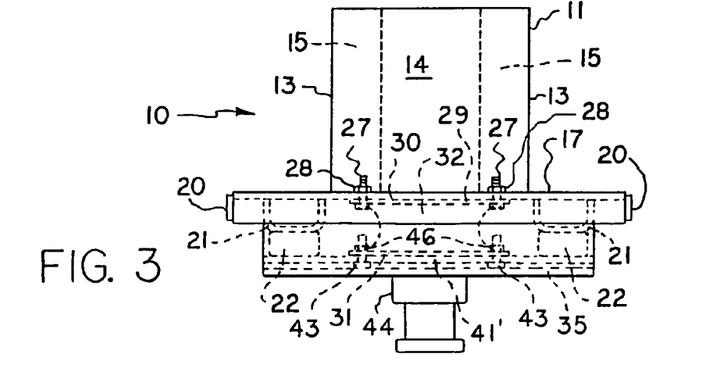
FIG. 3 is an end elevational view taken substantially in the direction of arrows 3—3 of FIG. 1.
Figure 4:
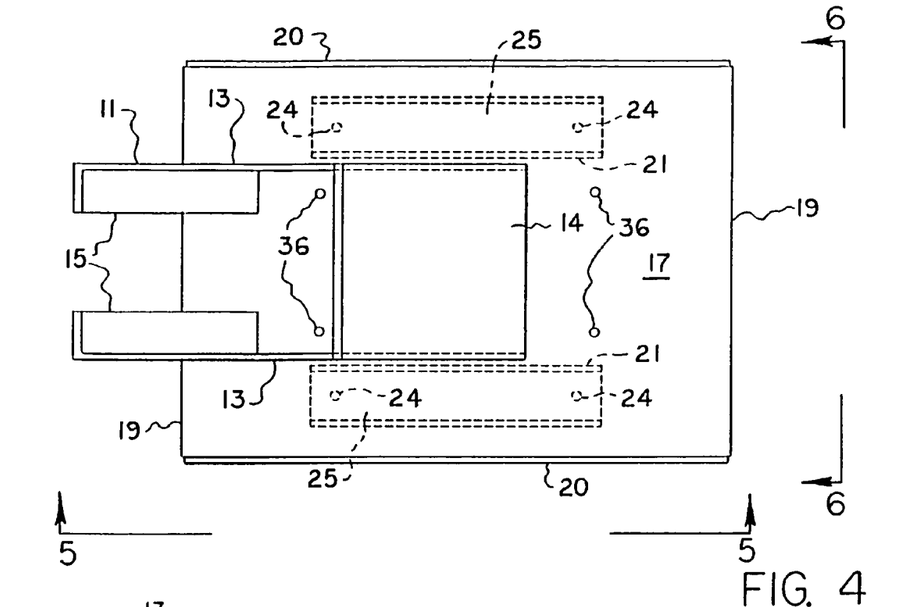
FIG. 4 is a plan view of the column attachment assembly shown in FIG. 1.
Figure 5:
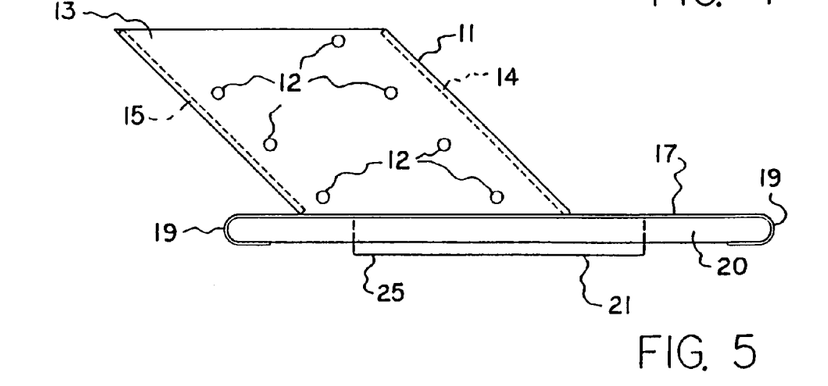
FIG. 5 is a side elevational view taken substantially in the direction of arrows 5—5 of FIG. 4.
Figure 6:
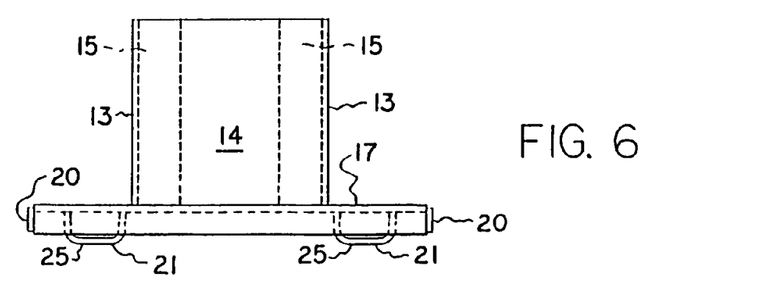
FIG. 6 is an end elevational view taken substantially in the direction of arrows 6—6 of FIG. 4.
Figure 7:
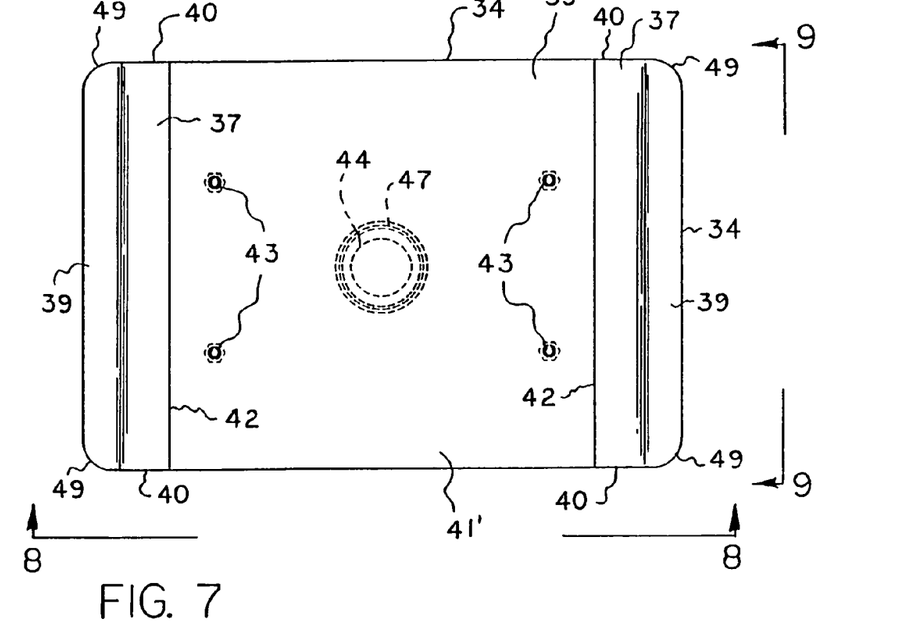
FIG. 7 is a plan view of the skid pad assembly shown in FIG. 1.
Figure 8:
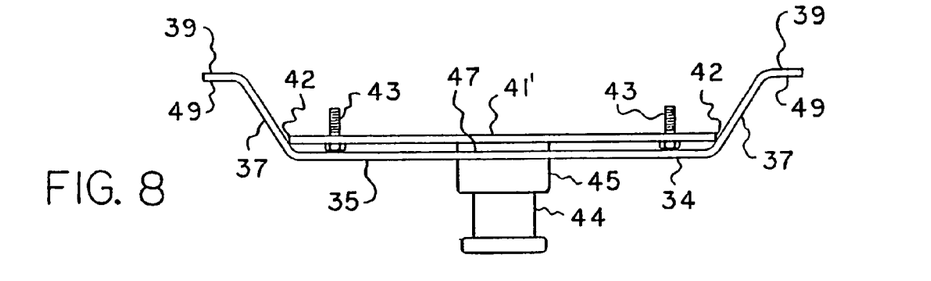
FIG. 8 is a side elevational view taken substantially in the direction of arrows 8—8 of FIG. 7.
Figure 9:
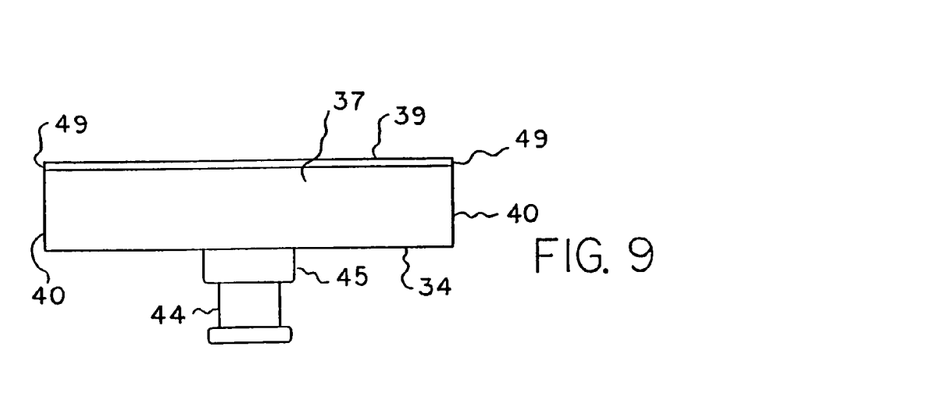
FIG. 9 is an end elevational view taken substantially in the direction of arrows 9—9 of FIG. 7.
Figure 10:
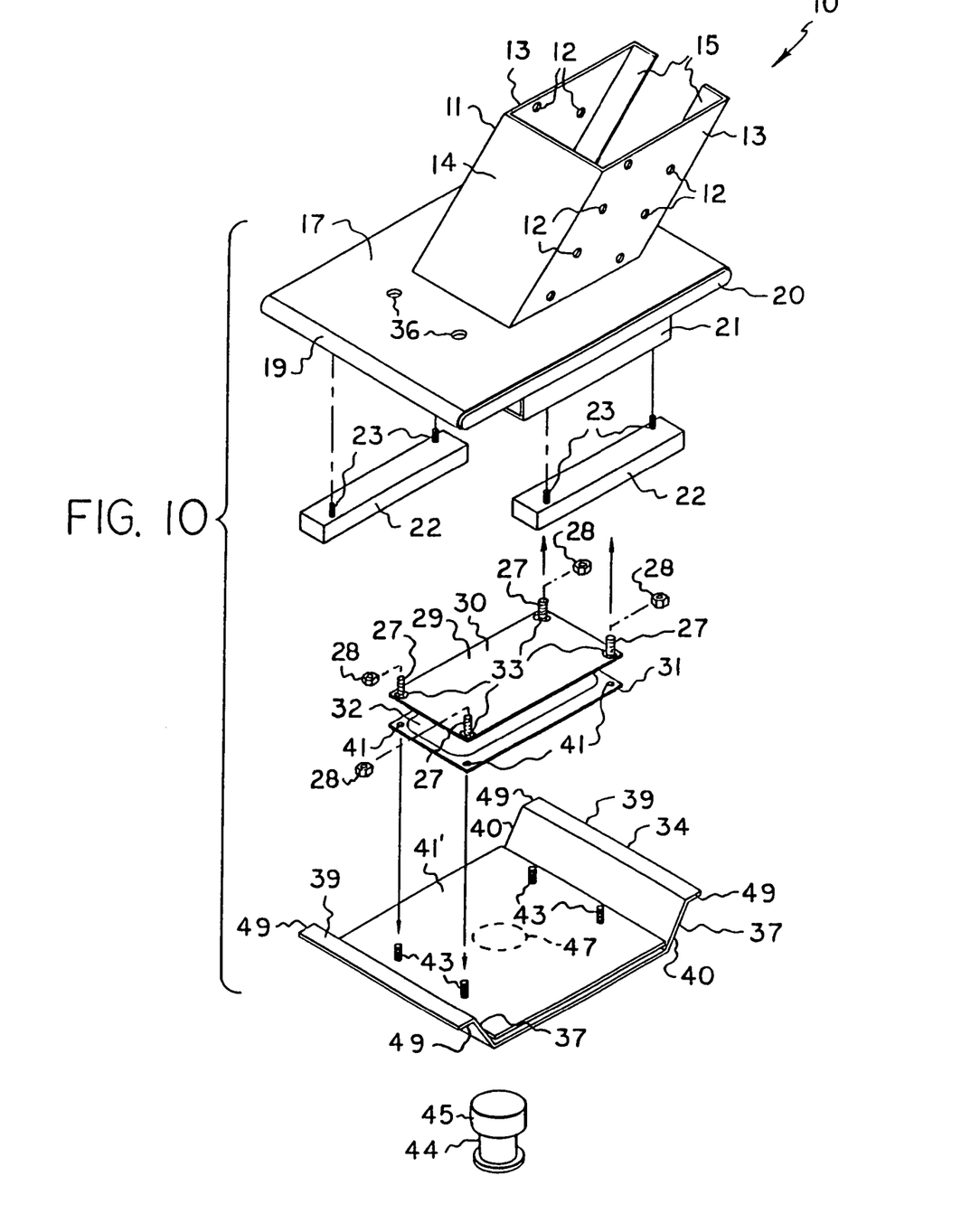
FIG. 10 is an exploded view of the fifth wheel pin box assembly shown in FIG. 1.
Figure 11:
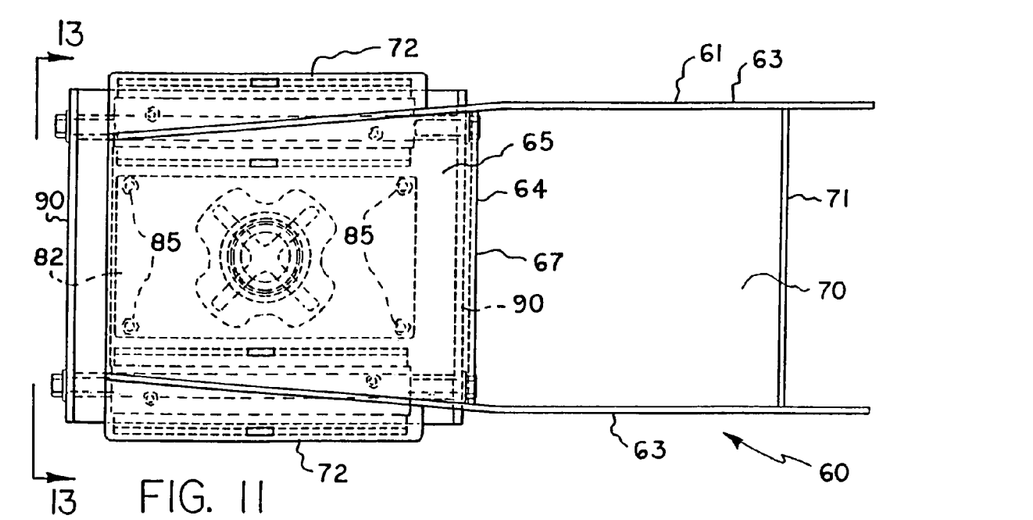
FIG. 11 is a plan view of another embodiment of an improved fifth wheel pin box assembly.
Figures 12, 13:
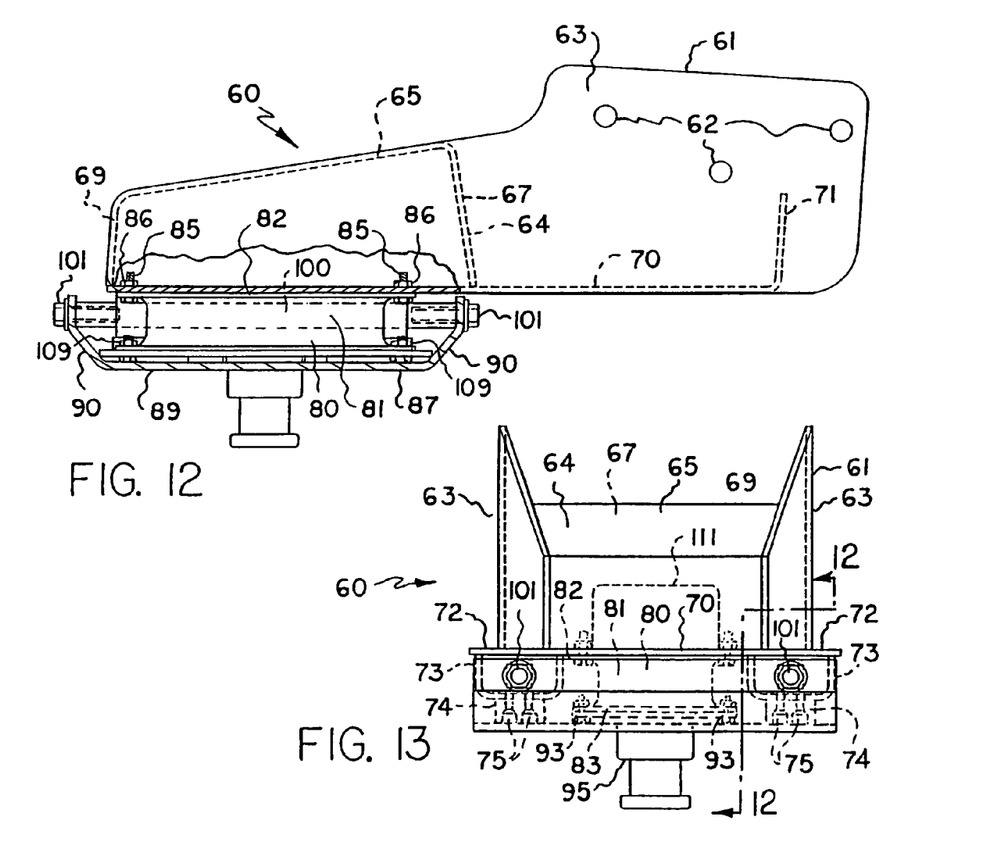
FIG. 12 is a partially broken-away side elevational view taken substantially in the direction of arrows 12—12 of FIG. 11.
FIG. 13 is an end elevational view taken substantially in the direction of arrows 13—13 of FIG. 11.
Figure 14:
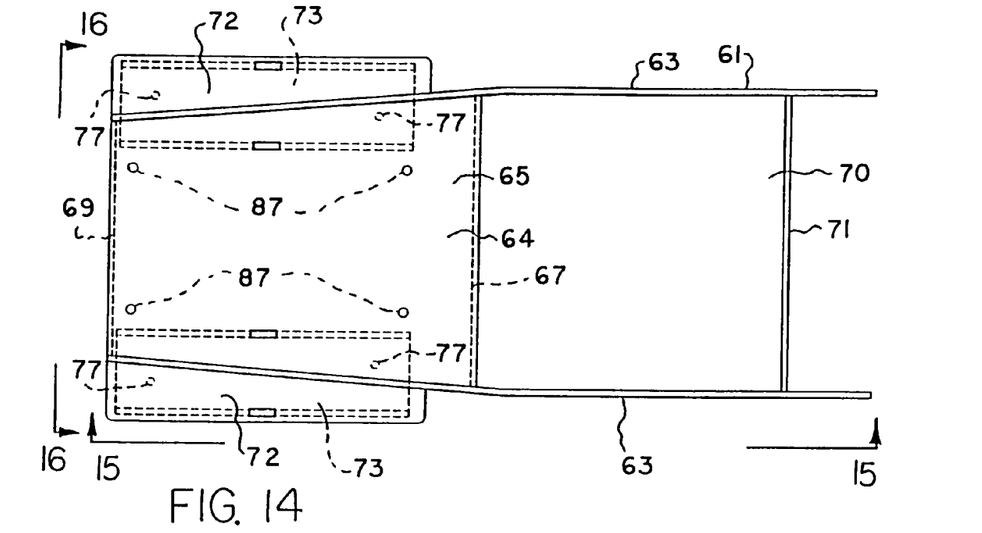
FIG. 14 is a plan view of the column attachment assembly shown in FIG. 1.
Figure 15:
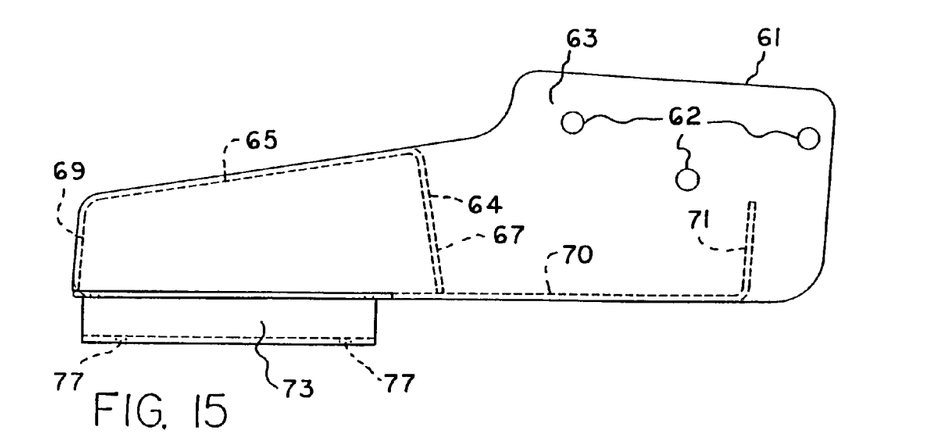
FIG. 15 is a side elevational view taken substantially in the direction of arrows 15—15 of FIG. 14.
Figure 16:
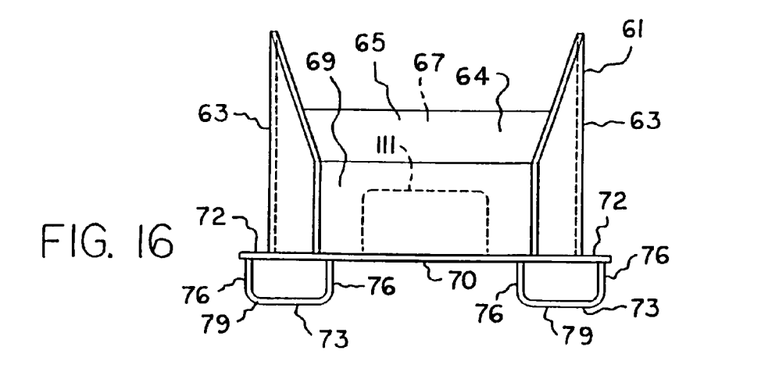
FIG. 16 is an end elevational view taken substantially in the direction of arrows 16—16 of FIG. 14.

A rubber shear spring 29 has an upper plate 30 and a lower plate 31 with a central rectangular rubber member 32 bonded therebetween. Bolts 27 are threaded through tapped holes 33 in upper plate 30, and the threaded stems of bolts 27 extend through holes 36 in top plate 17. The heads of bolts 27 bear against the underside of plate 30. Nuts 28 are threaded onto bolts 27 to secure upper plate 29 to top plate 17.

A skid pad assembly 34 includes a plate portion 35 with bent-up ends 37 which merge into horizontal end portions 39. The bent-up ends 37 have sides 40. A plate 41' has its edges 42 welded to upturned ends 37. A plurality of bolts 43 are welded in position on plate 41'. Bolts 43 are received in four apertures 41 in the corners of lower plate 31 of rubber shear spring 29 to thereby secure the skid plate to the rubber shear spring by means of nuts 46 secured to bolts 43.

A pin 44 has an upper portion 45 received in a circular opening 47 in plate portion 35 of skid pad 34, and the upper end portion of pin 44 is welded to plate portion 35 of skid pad 34 at opening 47. The pin 45 may be secured to the skid pad 34 by welding in the same manner as described hereafter relative to the embodiment of FIGS. 11–20. Pin 44 is of a standard conventional construction known in the art. As is well known, it has a reduced section which receives lever-operated jaws in the receiving mechanism on the towing vehicle to lock the pin therein.

The elongated plastic blocks 22 which are bolted to channels 21 bear against plate 41' of the skid pad assembly and space it from top plate 17. The ends 39 of plate 40 are located in spaced relationship to curved ends 19 of top plate 17 (FIG. 2) to thereby allow movement of ends 39 back and forth in FIG. 2 as the rubber shear spring flexes. Also, the sides 40 of ends 37 are spaced from strips 20 (FIG. 1). Thus, the skid pad assembly 34 can float laterally as well as longitudinally as the rubber 32 of the rubber shear spring 29 flexes during operation. During the floating action, plate 41' slides relative to the undersurfaces of plastic blocks 22. The range of floating before there is engagement between ends 39 of skid plate 41' and curved ends 19 of top plate 17, and before there is engagement between sides 40 of bent-up ends 37 with side strips 21 is well within the limits of stretching of the rubber 32. Thus, the skid plate 35 will essentially bottom out when the foregoing engagement occurs.

The fifth wheel pin box assembly 10 is assembled in the following manner. First, the channels 21 are welded to top plate 17. Then the plastic blocks 22 are attached to the channels 21. Then a subassembly is made by securing the rubber shear spring 29 to the skid pad assembly 34 by passing bolts 43 through holes 41 in the bottom plate 31 of the shear spring, and then tightening nuts 46 onto bolts 43. Thereafter, the assembled skid plate 34 and spring 29 is positioned with the upper portion of the spring between the blocks 22 and with the spring inclined so that one end 39 of the skid pad enters the curved end 19 of the top plate 19, and this end is moved into the curved end 19. Thereafter, the assembled skid pad and spring is pivoted so that the other end 39 is aligned with the other curved end 39 and then the skid pad is shifted horizontally until bolts 27 are aligned with holes 36 in top plate 17. Then the subassembly of the rubber shear spring and skid pad is moved vertically so that bolts 27 enter holes 36, and then nuts 28 are tightened onto bolts 27.

In FIGS. 11–20 another embodiment 60 of a fifth wheel pin box assembly is shown. This embodiment includes a column attachment member 61 for securement to a corresponding column (not shown) on a trailer by means of suitable connecting members, such as bolts, which extend through apertures 62 in the sides 63 which are welded to the edges of inverted U-shaped member 64 having a web 65 and depending legs 67 and 69. The side plates 63 are also welded to a top member in the form of a plate 70 having an upturned end 71. Plate 70 includes a pair of outer side portions 72 which extend outwardly beyond sides 63. A pair of channels 73 have the upper edges of their legs 76 welded to the underside of a top member. Elongated plastic blocks 74 have threaded studs 75 extending outwardly from their upper surfaces which are received in bores 77 in the webs 79 of channels 73, and nuts (not shown) are secured to studs 75 to hold blocks 74 in position against channel webs 79. As noted above, relative to FIGS. 1–10, the top member 70 need not be in the form of a plate, but may be any structure which supports the channels 73 or which serves the functions of the channels.

Figure 20:
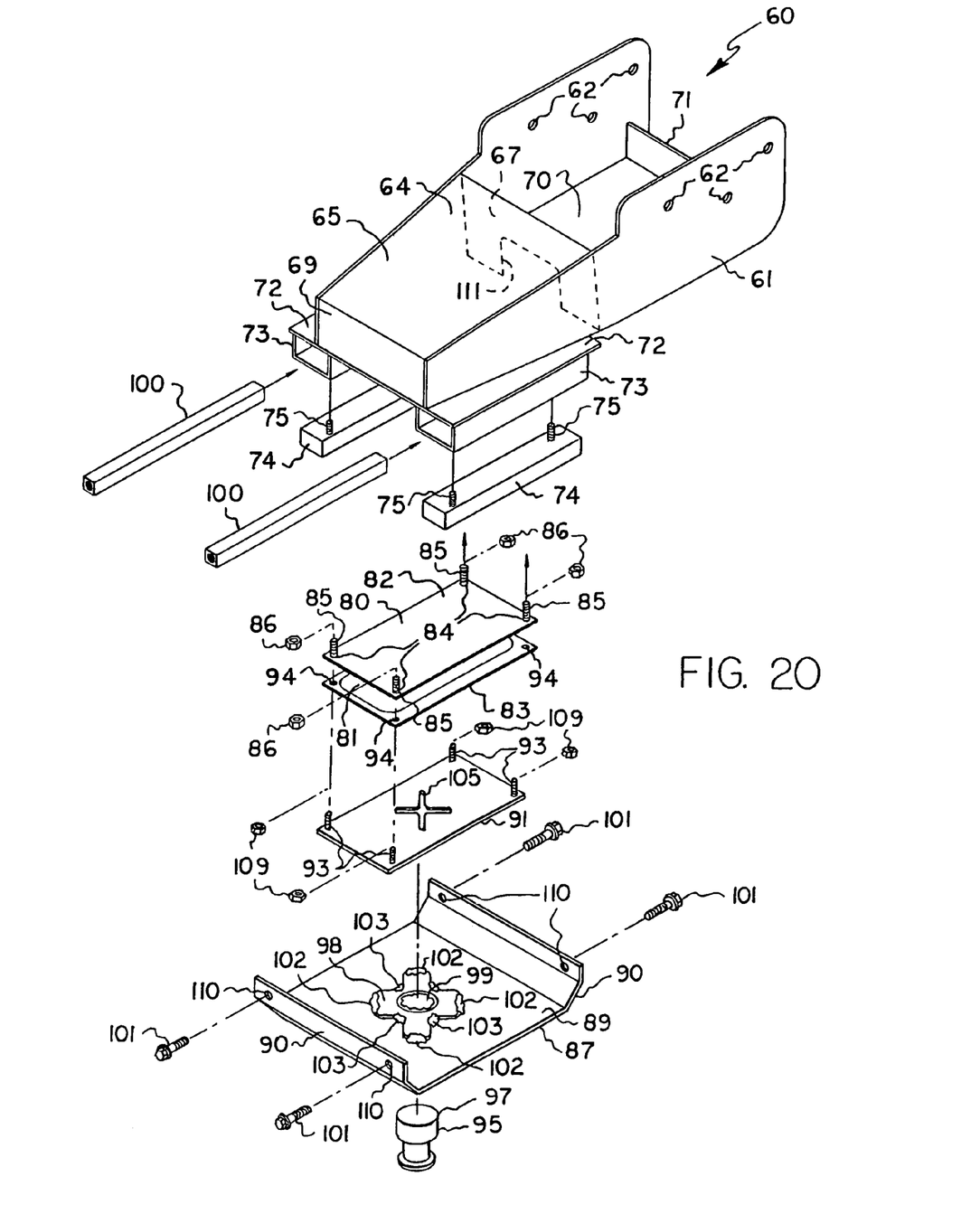
FIG. 20 is an exploded view of the fifth wheel pin box assembly shown in FIG. 11.

A rubber shear spring 80 includes a rubber member 81 which is bonded between upper plate 82 and lower plate 83. Upper plate 82 includes threaded bores 84 which receive bolts 85. The bolts are threaded through the threaded bores 84 with their heads bearing against the underside of top plate 82 and their threaded shanks extending upwardly (FIG. 20).

The pin box assembly 60 also includes a skid pad assembly 87 which includes a lower plate portion 89 having upturned ends 90. A plate 91 has its ends 92 welded to upturned ends 90 of plate 89 at 88. A plurality of bolts 93 are welded in position in plate 91. Bolts 93 extend through four bores 94 in the corners of bottom plate 83 of rubber shear spring 82 and receive nuts 109 to thereby secure skid plate 87 to rubber shear spring 80. Plastic blocks 74 bear against plate portion 89 of skid plate 87 and maintain it vertically spaced from plate 70 while permitting skid plate 87 to slide laterally in all directions as the rubber shear spring is stressed.

A pin 95 has its upper end 97 extending through aperture 99 in plate 89 and its upper end is welded to plate 91. An X-shaped washer 98 is welded to the top of plate portion 89 at 102 and 103, and a circular weld 104 surrounds the upper portion 97 of pin 95. The extreme upper circular surface of pin 95 abuts the underside of plate 91 which has an X-shaped opening 105 therein, and this opening is filled with weld 107 to thereby weld the top of pin 95 to plate 91. Pin 95, as is well known, is for attaching the pin box assembly to a suitable connection on a vehicle, as described above relative to pin 44.

Restraining shafts 100 are secured within spaced ends 90 of plate 89 by bolts 101. As can be seen primarily from FIGS. 12 and 13, in the assembled condition, restraining shafts 100 are located within the confined space of channels 73 and below plate 70 and there is a clearance on all sides of restraining shafts 100. The clearance is such that the restraining shafts 100 will abut the legs 76 of channels 73 when the rubber 81 of rubber shear spring 80 is stretched sufficiently within its stretchable limit. Thus, the channels 73 act as stops for restraining shafts to thereby limit the stretching of the rubber member 81 beyond its stretchable limit. Also, if the rubber 81 should become detached from its plates 82 and 83, restraining shafts 100 will maintain skid plate 87 in assembled relationship with channels 73 and thus prevent its separation from the remainder of the pin box assembly. While channels 73 have been shown to provide the confined spaces for the restraining shafts, it will be appreciated that the restraining shafts may be located within other structures which provide combined spaces such as tubular members or spaced U-members.

The pin box assembly 60 is assembled in the following manner. After the pin 95, plate 91 and plate 89 have been assembled and welded to each other in the above-described manner, the bottom plate 83 of spring 80 is mounted on bolts 93 by passing bolts 93 through holes 94 of bottom plate 83, and nuts 109 are tightened down on bolts 93 to thereby produce a subassembly of the skid plate 87 and rubber shear spring 80. Thereafter, restraining shafts 100 are inserted loosely into channels 73. The subassembly of skid plate 87 and rubber shear spring 80 is moved upwardly so that the top plate 82 of shear spring 80 is located between channels 73 and threaded bolts 85 enter bores 87 (FIG. 14) in bottom plate 70. Thereafter, nuts 86 are tightened down onto bolts 85 in order to assemble the top plate 82 of rubber shear spring 80 with bottom plate 70. Thereafter, each of the restraining shafts 100 is aligned with bores 110 in upturned ends 90, and bolts 101 are threaded into the ends of restraining shafts 100. Access to the bolts 85 is obtained through an opening 111 in rear leg 67 of inverted U-shaped member 64.

Figure 17:
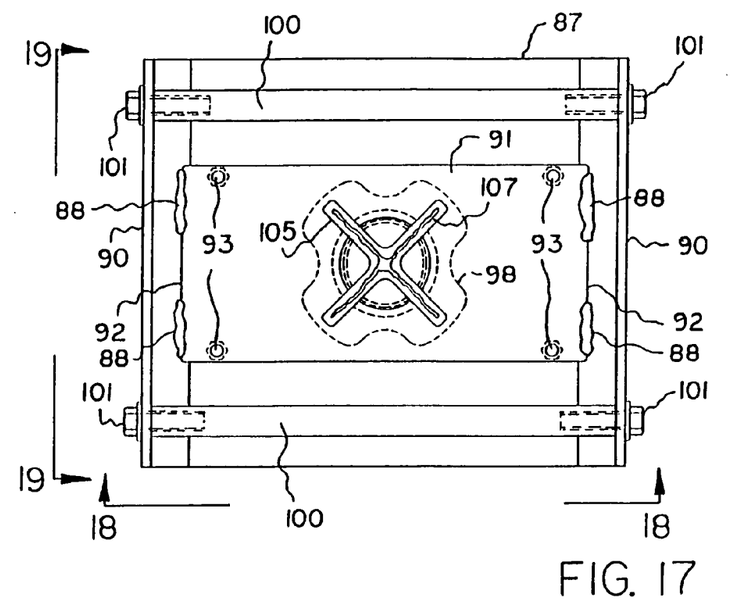
FIG. 17 is a plan view of the skid pad assembly shown in FIG. 11.
Figure 18:
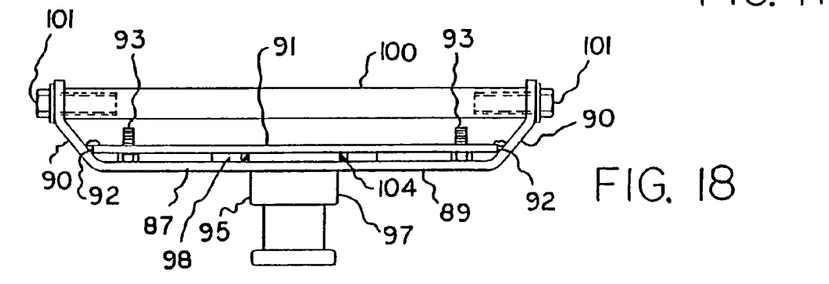
FIG. 18 is a side elevational view taken substantially in the direction of arrows 18—18 of FIG. 17.
Figure 19:
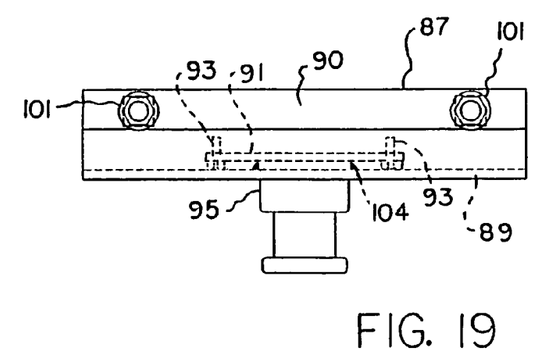
FIG. 19 is an end elevational view taken substantially in the direction of arrows 19—19 of FIG. 17.
Figure 21:
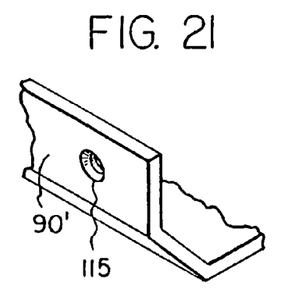
FIG. 21 is a fragmentary perspective view of a modification of the skid pad of FIGS. 17–19.

A modification of the skid pad of FIGS. 17–19 is shown in FIG. 21. The only difference is that the four holes 110 of FIG. 20 in upturned ends 90 are countersunk to receive flat headed bolts so that the heads of the bolts will lie substantially flat with the surfaces of upturned ends 90.

While preferred embodiments of the present invention has been disclosed, it will be appreciated that it is not limited thereto but may be otherwise embodied within the scope of the following claims.

What is claimed is:

1. A fifth wheel pin box assembly for towing a trailer behind a towing vehicle comprising a top member, a single rubber shear spring, said shear spring including first and second plates and a single rubber member, said first plate attached relative to said top member, a skid pad, said second plate attached relative to said skid pad, said rubber member bonded between said first and second plates, a pin extending downwardly from said skid pad, and a column secured to said top member.

2. A fifth wheel pin box assembly for towing a trailer behind a towing vehicle comprising a top member, a rubber shear spring, said shear spring including first and second plates and a rubber member, said first plate attached relative to said top member, a skid pad, said second plate attached relative to said skid pad, said rubber member bonded between said first and second plates, and a pin extending downwardly from said skid pad, and including spaced blocks positioned between said top member and said skid pad and located on opposite sides of said shear spring.

3. A fifth wheel pin box assembly as set forth in claim 2 wherein said blocks are secured relative to said top member.

4. A fifth wheel pin box assembly as set forth in claim 3 wherein said blocks are secured to channels which are secured to said top member.

5. A fifth wheel pin box assembly as set forth in claim 1 including downwardly depending first edge portions on said top member, said first edge portions defining bent-over ends, and second edge portions on said skid plate within and spaced from said first edge portions.

6. A fifth wheel pin box assembly as set forth in claim 5 and strips on sides of said top member.

7. A fifth wheel pin box assembly as set forth in claim 1 including at least one confined space located relative to said top member, a restraining shaft located within said confined space, and said restraining shaft being connected to said skid pad.

8. A fifth wheel pin box assembly for towing a trailer behind a towing vehicle comprising a top member, a rubber shear spring, said shear spring including first and second plates and a rubber member, said first plate attached relative to said top member, a skid pad, said second plate attached relative to said skid pad, said rubber member bonded between said first and second plates, and a pin extending downwardly from said skid pad, and at least one confined space located relative to said top member, a restraining shaft located within said confined space, and said restraining shaft being connected to said skid pad, a channel member secured to said top member, and wherein said confined space is within said channel member.

9. A fifth wheel pin box assembly for towing a trailer behind a towing vehicle comprising a top member, a rubber shear spring, said shear spring including first and second plates and a rubber member, said first plate attached relative to said top member, a skid pad, said second plate attached relative to said skid pad, said rubber member bonded between said first and second plates, and a pin extending downwardly from said skid pad, at least one confined space located relative to said top member, a restraining shaft located within said confined space, and said restraining shaft being connected to said skid pad, a column secured to said top member, spaced blocks positioned between said top member and said skid pad and located on opposite sides of said shear spring.

10. A fifth wheel pin box assembly as set forth in claim 9 wherein said blocks are secured relative to said top member.

11. A fifth wheel pin box assembly as set forth in claim 10 wherein said blocks are secured to channels which are secured to said top member.

12. A fifth wheel pin box assembly for towing a trailer behind a towing vehicle comprising a top member, a rubber shear spring, said shear spring including first and second plates and a rubber member, said first plate attached relative to said top member, a skid pad, said second plate attached relative to said skid pad, said rubber member bonded between said first and second plates, and a pin extending downwardly from said skid pad, at least one confined space located relative to said top member, a restraining shaft located within said confined space, and said restraining shaft being connected to said skid pad, spaced blocks positioned between said top member and said skid pad and located on opposite sides of said shear spring.

13. A fifth wheel pin box assembly as set forth in claim 12 wherein said blocks are secured relative to said top member.

14. A fifth wheel pin box assembly as set forth in claim 13 wherein said blocks are secured to channels which are secured to said top member.

15. A fifth wheel pin box assembly as set forth in claim 12 wherein said skid pad is in sliding engagement with said blocks.

16. A fifth wheel pin box assembly as set forth in claim 15 wherein said blocks are secured relative to said top member.

17. A fifth wheel pin box assembly as set forth in claim 16 wherein said blocks are secured to channels which are secured to said top member.

18. A fifth wheel pin box assembly for towing a trailer behind a towing vehicle comprising a top member, a rubber shear spring, said shear spring including first and second plates and a rubber member, said first plate attached relative to said top member, a skid pad, said second plate attached relative to said skid pad, said rubber member bonded between said first and second plates, and a pin extending downwardly from said skid pad, first and second spaced confined spaces located relative to said top member, first and second restraining shafts located within first and second confined spaces and connected to said skid pad.

19. A fifth wheel pin box assembly as set forth in claim 18 including first and second spaced blocks positioned between said top member and said skid pad and located on opposite sides of said shear spring.

20. A fifth wheel pin box assembly as set forth in claim 19 wherein said first and second spaced blocks are secured relative to said top member.

21. A fifth wheel pin box assembly as set forth in claim 20 wherein said first and second blocks are secured to first and second channels which are secured to said top member, and wherein said first and second confined spaces are within said first and second channels.

* * * * *